United States Patent
Hong et al.

(10) Patent No.: US 8,553,887 B2
(45) Date of Patent: Oct. 8, 2013

(54) METHOD FOR GENERATING DYNAMIC GROUP KEY

(75) Inventors: Man Pyo Hong, Seongnam-si (KR); Jong Uk Kim, Suwon-si (KR); Suk In Kang, Ansan-si (KR)

(73) Assignee: Ajou University Industry Cooperation Foundation, Gyeonggi-Do (KR)

( * ) Notice: Subject to any disclaimer, the term of this patent is extended or adjusted under 35 U.S.C. 154(b) by 368 days.

(21) Appl. No.: 12/609,968

(22) Filed: Oct. 30, 2009

(65) Prior Publication Data

US 2011/0085665 A1 Apr. 14, 2011

(30) Foreign Application Priority Data

Oct. 13, 2009 (KR) .................. 10-2009-0097026

(51) Int. Cl.
- *H04L 9/08* (2006.01)
- *H04K 1/00* (2006.01)
- *H04L 9/00* (2006.01)
- *H04L 9/28* (2006.01)
- *H04L 9/32* (2006.01)
- *G06F 15/16* (2006.01)
- *G06F 17/30* (2006.01)
- *G06F 11/30* (2006.01)

(52) U.S. Cl.
USPC ............... 380/278; 380/28; 380/29; 380/279; 726/3; 713/168; 713/194

(58) Field of Classification Search
USPC .............. 713/155–159, 160–167, 189–193; 709/229; 380/28–30, 255–286
See application file for complete search history.

(56) References Cited

U.S. PATENT DOCUMENTS

| | | | |
|---|---|---|---|
| 2004/0078570 A1* | 4/2004 | Geiringer et al. | 713/165 |
| 2008/0046763 A1* | 2/2008 | Teramoto et al. | 713/194 |
| 2010/0329463 A1* | 12/2010 | Ratliff et al. | 380/279 |
| 2011/0249817 A1* | 10/2011 | Park et al. | 380/281 |

* cited by examiner

*Primary Examiner* — Evans Desrosiers
(74) *Attorney, Agent, or Firm* — Lathrop & Gage LLP

(57) ABSTRACT

A method of generating a dynamic group key of a group formed of a plurality of nodes, the method including: unicasting a public key that is based on respective secret keys of each of a plurality of general nodes excluding a master node, which is one of the plurality of nodes, wherein the unicasting is performed by the general nodes; broadcasting to the group an encryption value obtained by exponentially-calculating a secret key of the master node to the plurality of public keys, wherein the broadcasting is performed by the master node upon receiving the plurality of public keys; and obtaining a group key by using an inverse power-calculation of the respective secret keys of each of the general nodes based on the encryption value, wherein the obtaining is performed by the general nodes.

4 Claims, 4 Drawing Sheets

METHOD FOR GENERATING DYNAMIC GROUP KEY

CROSS-REFERENCE TO RELATED PATENT APPLICATION

This application claims the benefit of Korean Patent Application No. 10-2009-0097026, filed on Oct. 13, 2009, in the Korean Intellectual Property Office, the disclosure of which is incorporated herein in its entirety by reference.

BACKGROUND OF THE INVENTION

The present invention relates to a method of generating a group key between a plurality of nodes which are group members, and more particularly, to an effective and practical method of generating a group key using a Diffie-Hellman algorithm.

An online conference is a method of sharing opinions while looking at each other and hearing each other's voices without having to come face to face with each other, and reduces physical and temporal expenses. Accordingly, meetings online are increasing as compared to meetings offline, and applications such as a remote video conferencing programs are being developed. The online conference, handling various subjects in various environments, may involve confidential information that must not be leaked, and that must be exposed to no one except to members of the online conference. Accordingly, a plurality of nodes form one group in a certain environment, such as an online conference, and perform encryption in order to avoid data from being exposed outside the group while sharing the data. In various encryption algorithms for protecting the data, a key for data encryption is pre-distributed between the nodes. However, distributing an encryption key in an unsecured channel is an important issue.

A group key is agreed so as to provide a session key to members of the group that wish to securely communicate through an open communication network. Specifically in a mobile computing environment, the resources of devices are limited, and thus it is essential to use energy efficiently during a group key agreement process.

Key exchanging techniques include a Diffie-Hellman technique in which nodes share a key when there are not any secured channels. However, the Diffie-Hellman technique is not suitable for a plurality of nodes to exchange a key. Various group key setting mechanisms using the Diffie-Hellman technique exist, but conventional technologies are unpractical since many operations need to be performed as the conventional technologies require an order of exchanging messages or have a large number of messages to be transmitted. Accordingly, a method of simply generating a group key by exchanging messages only once without an order or a chain by using a master node is suggested herein.

SUMMARY OF THE INVENTION

The present invention provides a method of effectively generating a group key while using Diffie-Hellman. For efficiency and practicality, a chain that requires an order of transmitting messages is not required, and a secure and efficient group key agreement is possible between nodes without having to transmit and receive messages a plurality of times.

The present invention also provides a reliable system in which a node does not affect the setting of a group key, unlike a conventional technology in which an entire group key cannot be set when a problem occurs in a node. A problem that may occur in a node may be a physical disorder, operation incapacity, or transmission incapacity. According to the reliable system of the present invention, nodes excluding a node having a problem successfully obtain a group key, and even when a message is eavesdropped by another node, the other node is unable to obtain the group key unless the other node knows a secret value of each node, which is used to generate an open-secret value.

The present invention also provides a key agreement that dynamically adapts to changes of a group. According to the key agreement, operations performed by all nodes excluding a master node are symmetric even when the size of the group increases or decreases, and a node requires only one reception message even when a group key changes. The key agreement easily adapts to dynamic changes of the groups during the mergence or division of groups, without a big change to the entire system, through a delegation process of an open-secret key list of the master node, and guarantees backward secrecy and forward secrecy.

According to an aspect of the present invention, there is provided a method of generating a dynamic group key of a group formed of a plurality of nodes, the method including: unicasting a public key that is based on respective secret keys of each of a plurality of general nodes excluding a master node, which is one of the plurality of nodes, wherein the unicasting is performed by the general nodes; broadcasting to the group an encryption value obtained by exponentially-calculating a secret key of the master node to the plurality of public keys, wherein the broadcasting is performed by the master node upon receiving the plurality of public keys; and obtaining a group key by using an inverse power-calculation of the respective secret keys of each of the general nodes based on the encryption value, wherein the obtaining is performed by the general nodes.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 2A:
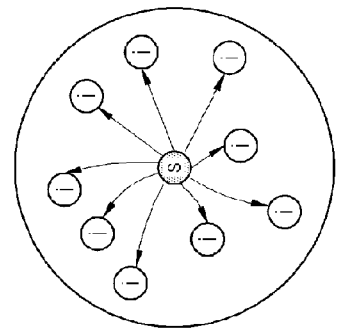
FIG. 2 is a diagram for describing a method of exchanging a key between a plurality of nodes in a group, according to an embodiment of the present invention.

Hereinafter, the present invention will be described more fully with reference to the accompanying drawings, in which exemplary embodiments of the invention are shown. In the drawings, the sizes of elements may be exaggerated for clarity.

Figure 1:
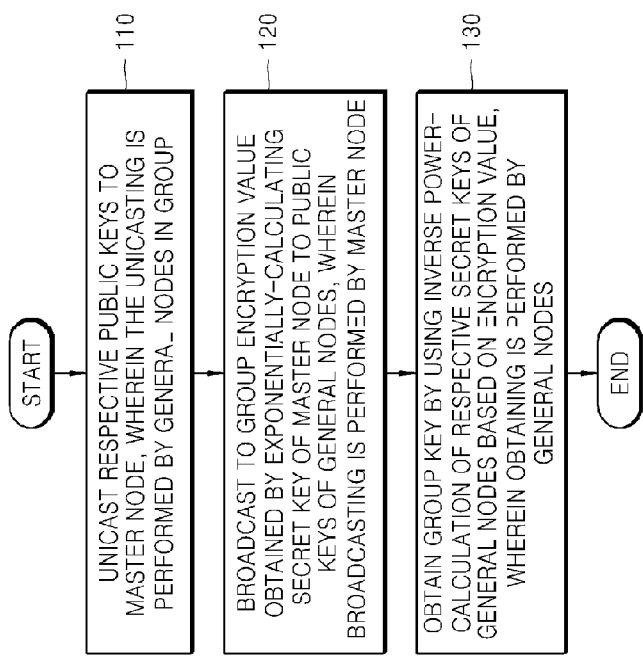
FIG. 1 is a flowchart illustrating a method of generating a dynamic group key of a group formed of a plurality of nodes, according to an embodiment of the present invention.

FIG. 1 is a flowchart illustrating a method of generating a dynamic group key of a group formed of a plurality of nodes, according to an embodiment of the present invention.

According to a Diffie-Hellman algorithm constituting key exchanging algorithms, two nodes (Alice and Bob) may obtain one common secret value that may be shared between Alice and Bob by using respective secret values. Two numbers p and g are publicized, and are used by all users in a system. Here, p is a prime number and g is an integer (primitive element) smaller than p, wherein all elements from 1 to p−1 are obtained using a mod operation. Assuming that Alice and Bob respectively generate private keys a and b, the common secret value ($g^{ab}$ mod p) is obtained by using p, g, and the private keys a and b.

Methods of sharing a key between a plurality of nodes by using such a Diffie-Hellman key exchanging method have been suggested. Conventional methods, such as a Gap Diffie-Hellman (GDH) and Burmester-Desmedt (BD) protocol, require many exponential-calculations and a plurality of message transmitting and receiving processes during a group key agreement process. In the BD protocol, a group key is agreed as each node communicates with neighboring nodes to obtain a key value, and then the obtained key value is broadcasted to the entire nodes. Thus, as the number of nodes increases, the number of operations to be performed and messages to be received increase. In the GDH protocol, each node forms a chain so as to sequentially transmit a message, and the last node operates as a master node that broadcasts. Thus the latter nodes in the chain should transmit and receive more messages and performs more operations than the earlier nodes in the chain.

Referring to the method of FIG. 1, general nodes in the group, excluding a master node that is a node from among the plurality of nodes, unicast to the master node respective public keys that are based on respective secret keys of each of the general nodes, in operation 110. Then, the master node that received the public keys broadcasts to the group an encryption value obtained by exponentially-calculating a secret key of the master node to the plurality of public keys, in operation 120. Next, the general nodes excluding the master node obtain a group key by using an inverse power-calculation of the respective secret keys of each of the general nodes based on the encryption value, in operation 130.

According to the method, a group key is effectively and securely set between nodes that do not have a secured channel. Also, the performance of an entire system increases since the number of messages to be transmitted and received during the key agreement process is low and the number of operations to be performed by the nodes is also low. In addition, an order of the messages to be transmitted and received, or a chain of the nodes is not required, and thus the group key is set without any problems even when one or more nodes in the group have an error, and thus the reliability of the entire system increases.

Figure 2B:
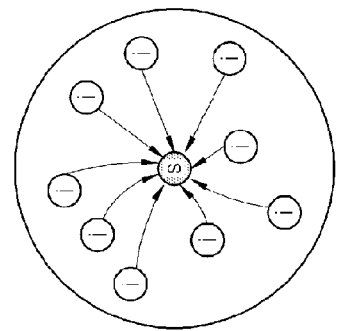

FIG. 2 is a diagram for describing a method of exchanging a key between a plurality of nodes in a group, according to an embodiment of the present invention.

Referring to FIG. 2, a method of generating a group key includes two operations, where the method is applied to the nodes. As shown in FIG. 2(*a*), a plurality of general nodes i transmit respective random numbers to a master node s (Round 1), and as shown in FIG. 2 (*b*), the master node s broadcasts an encryption message generated by adding the random numbers received from the general nodes and a group key generated by the master node s to each of the general nodes i (Round 2). The general nodes i extract respective private values from the broadcasted message, thereby obtaining a common group key. Here, the master node s transmitting the message generated by adding the respective random numbers received from the general nodes i and a group key generated by the master node s and the general nodes i obtaining the common group key from the message may be securely performed based on a Diffie-Hellman technique. Here, it is assumed that the general nodes i have a nonce value for generating an open-secret value. Also, it is assumed that the master node s is one group member of the nodes included in the group, and is predetermined while the group is formed.

According to the current embodiment of the present invention, the plurality of nodes in the group determine the master node s in the group. The general nodes i, excluding the master node s, generate respective open-secret values by using a shared value g (exponentiation base) and respective nonce values $r_i$, and transmit the respective open-secret values to the master node s (FIG. 2 (*a*)). The master node s broadcasts a result of exponentially-calculating a secret key $r_s$ to the respective open-secret values.

$$M_i \rightarrow M_s : g^{r_i} (i \in [1,n], i \neq s)$$

$$M_s \Rightarrow M_i : \{g^{r_i r_s} | i \in [1,n], i \neq s\} \quad \text{[Equation 1]}$$

In Equation 1, Ms denotes the master node s, and Mi denotes the general nodes i excluding the master node s. Since the number of nodes is n and the master node s is one of the nodes, the general nodes i have an index value between 1 and n excluding the master node s, where n is a positive integer. Also, a symbol "→" denotes a unicast transmission and a symbol "⇒" denotes a broadcast transmission. The general nodes i perform a unicast transmission to the master node s, and the master node s performs a broadcast transmission to the general nodes i.

In Equation 1, g raised to the $r_i$-th power ($g^{r_i}$) transmitted to the master node s is the open-secret value generated by using an open value g and a secret value $r_i$ of a node. Upon receiving the open-secret values from the general nodes i, the master node s broadcasts an encrypted message generated by exponentially-calculating a secret value $r_s$ of the master node s to the open-secret values. Here, the encrypted message is referred to as an envelope. Even when a open-secret value is exposed, it is impossible to obtain a group key $g^{rs}$ from the envelope of the master node s, if the secret value $r_i$ is not determined.

The general nodes i may obtain the group key $g^{rs}$ from the envelope of the master node s according to Equation 2 below.

$$g^{r_i r_s r_i^{-1}} \quad \text{[Equation 2]}$$

In other words, a predetermined general node i may obtain the group key $g^{rs}$ through an inverse power of the respective secret value $r_i$ from the envelope received from the master node s. The N nodes, including the master node s, commonly share the group key $g^{rs}$, and such a process of the general nodes i obtaining the group key $g^{rs}$ from the envelope is called decryption.

Figure 3:
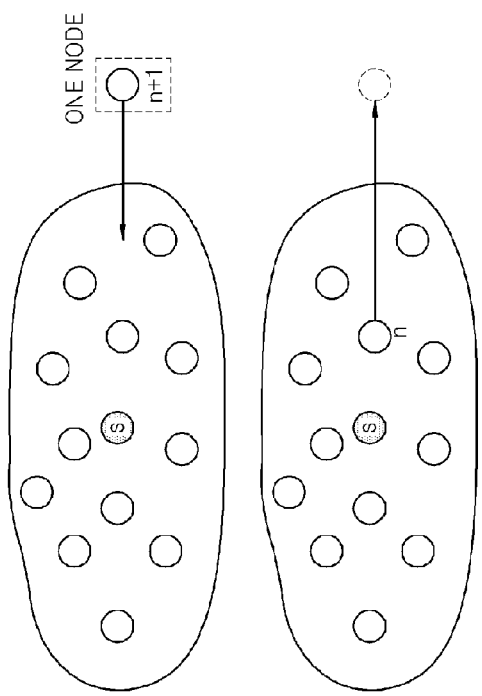
FIG. 3 is a diagram for describing a case when a node joins or leaves a group.

FIG. 3 is a diagram for describing a case when a node joins or leaves a group.

When a new general node joins or leaves a group after a group key is once generated, a master node re-broadcasts the envelope including new group key by using open-secret values of general nodes, wherein the open-secret values are pre-included in the master node, and thus a new group key is efficiently generated and the previous group key is protected.

Figure 4:
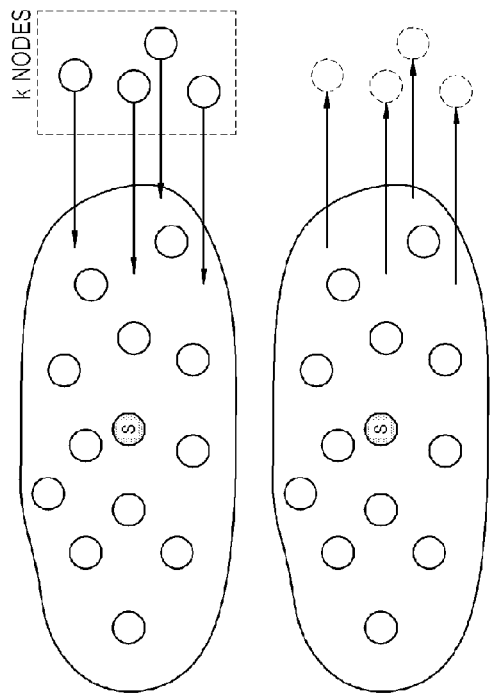
FIG. 4 is a diagram for describing a case when a plurality of nodes join or leave a group.

As stated, FIG. 3 illustrates one general node joining or leaving the group, and FIG. 4 illustrates that a group dynamically adapts to a change when a plurality of general nodes join or leave the group. Equations 3 and 4 are respectively used when one new general node and a plurality of new general nodes join a group, and Equation 5 is used when one or more general nodes leave a group.

$$M_{n+1} \rightarrow M_s : g^{r_{n+1}}$$

$$M_s \Rightarrow M_i : \{g^{r_i r_s} | i \in [1, n+1], i \neq s\} \qquad \text{[Equation 3]}$$

In Equation 3, n+1 denotes the new general node that joins the group including n general nodes. Like Equation 1, the new general node n+1 unicasts an open-secret value ($g^{r(n+1)}$) to the master node. Then, the master node newly generates a secret value $r_s$ of the master node, and broadcasts an envelope to the general nodes in the group including the new general node n+1.

FIG. 4 is a diagram for describing a case when a plurality of nodes join or leave a group.

$$M_j \rightarrow M_s : g^{r_j} (j \in [n+1, n+k])$$

$$M_s \Rightarrow M_i : \{g^{r_i r_s} | i \in [1, n+k], i \neq s\} \qquad \text{[Equation 4]}$$

Equation 4 is used when k new general nodes join the group, and is similar to Equation 3 that is used for one general node joining; however in Equation 4, an index value j is used to indicate a set of new general nodes. The k new general nodes unicast respective open-secret values to the master node, and the master node broadcasts an envelope so that the entire general nodes decrypt a new group key.

$$M_s \Rightarrow M_i : \{g^{r_i r_s} | i \in [1, n] \wedge i \notin L\} \qquad \text{[Equation 5]}$$

Equation 5 is used when one or more general nodes leave the group. Here, L denotes a set of one or more general nodes that leave the group. The master node generates a new secret value $r_s$, generates an envelope by using open-secret values of general nodes excluding the set L, and broadcasts the envelope to the group excluding the set L. Accordingly, even when a node that left the group eavesdrops on the envelope, the envelope does not include an open-secret value ($g^{r_i}$ included in the set L) of the node, and thus the node cannot extract the new group key.

Figure 5:
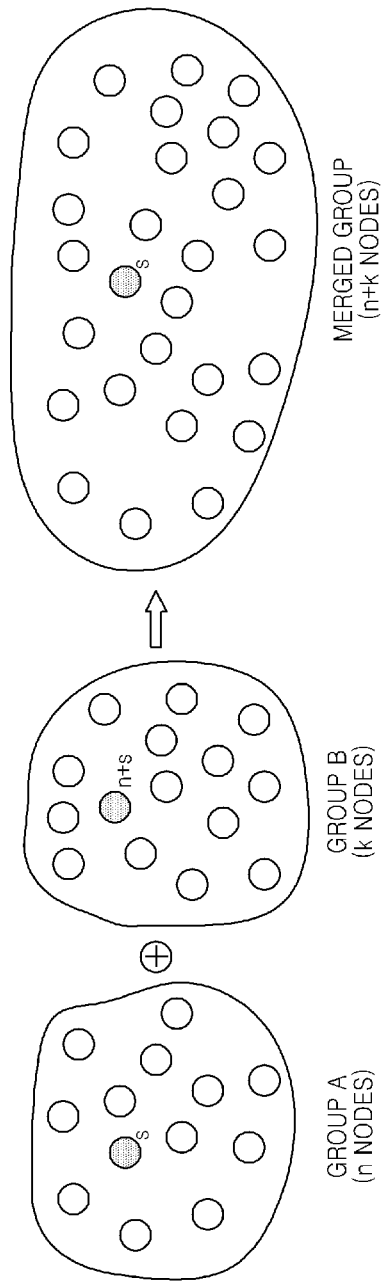
FIG. 5 is a diagram for describing a method of merging two groups.

FIG. 5 is a diagram for describing a method of merging two groups A and B.

In the present invention, a group key is efficiently re-set through open-secret key list delegation between master nodes when two groups merge into one group or one group is divided into two groups.

$$M_{n+s} \rightarrow M_s : \{g^{r_j} | j \in [n+1, n+k], j \neq n+s\}$$

$$M_{n+s} \rightarrow M_s : g^{\widehat{r_{n+s}}}$$

$$M_s \Rightarrow M_i : \{g^{r_i r_s} | i \in [1, n+k], i \neq s\} \qquad \text{[Equation 6]}$$

Referring to FIG. 5, it is assumed that group B having k nodes is merged with group A having n nodes. After the groups A and B merge into a group, the total number of nodes will be n+k. A master node of the group B is indicated as n+s by using an index of a master node s of the group A in FIG. 5, and j denotes the nodes of the group B in Equation 6. The master node n+s of the group B unicasts an open-secret key list of the group B to the master node s of the group A. Here, since an open-secret value ($g^{r(n+s)}$) of the master node n+s is used as a group key of the group B, the group key is newly generated and transmitted so as to guarantee backward secrecy. After the mergence, the master node s of the group A becomes a new master node s of the merged group, an envelope is generated by using open-secret values of the n+k nodes, and broadcasted to the merged group.

Figure 6:
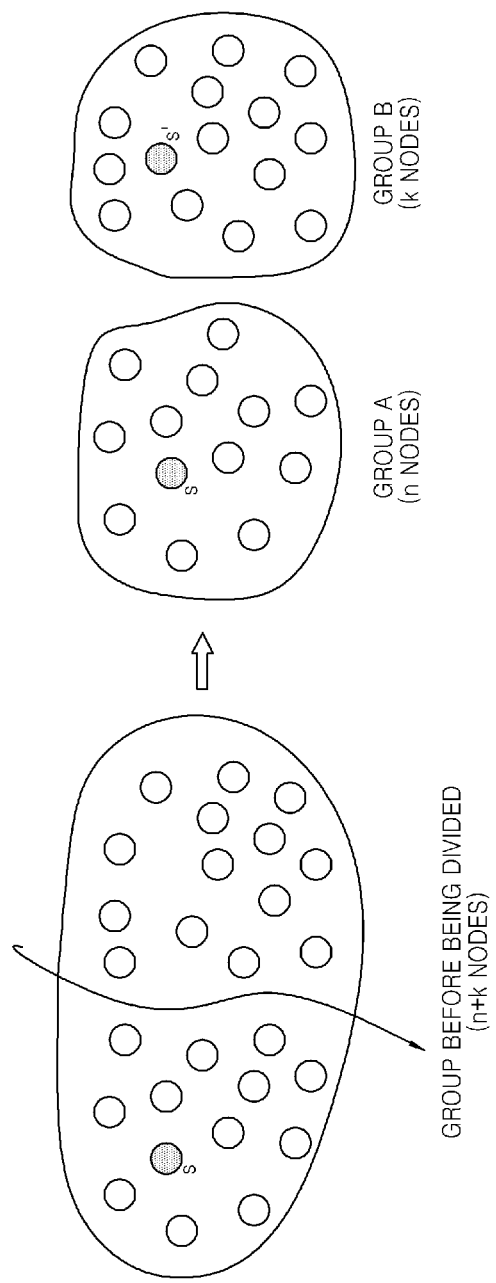
FIG. 6 is a diagram for describing a method of dividing a group into two groups.

FIG. 6 is a diagram for describing a method of dividing a group into two groups A and B.

$$M_s \rightarrow M_{s'} : \{g^{r_i} | i \in L\}$$

$$M_s \Rightarrow M_i : \{g^{r_i r_s} | i \in [1, n] \wedge i \notin L\}$$

$$M_{s'} \Rightarrow M_i : \{g^{r_i r_{s'}} | i \in L\} \qquad \text{[Equation 7]}$$

Equation 7 is used when the group is divided, on the contrary to Equation 6.

In Equation 7, s denotes a master node of the group before being divided, and s' denotes a master node of the group B after the group is divided. The master node s unicasts an open-secret key list of k nodes of the group B to the master node s'. Then, the master node s generates an envelope by using open-secret values of n nodes, excluding the k nodes, and broadcasts the envelope to the group A. Meanwhile, the master node s' of the group B broadcasts an envelope to the group B by using a delegated list. General nodes in the groups A and B may obtain respective group keys by decrypting respective envelopes of groups A and B.

As described above, nodes that do not have a secured channel can efficiently and securely set a group key. Here, the number of transmission/reception messages generated while generating the group key is low, and operations to be performed by each node is low, and thus the performance of the entire system increases.

Also, an order of transmitting or receiving messages or a chain of nodes is not required, and thus even when one or more nodes malfunction in a group, the corresponding one or more nodes do not affect a group key agreement of other nodes. Also, when a message is exposed by an attacker, the attacker is not able to obtain a group key, and thus the reliability of the system increases.

Moreover, the group key is efficiently re-set even under a dynamically changing environment wherein a node frequently joins or leaves the group, or groups merge (fuse) or divide (separate).

The embodiments of the present invention can be written as computer programs and can be implemented in general-use digital computers that execute the programs using a computer readable recording medium.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of generating a dynamic group key of a group formed of a plurality of general nodes and a master node, said method comprising:

each of the general nodes generating a public key that is based on respective secret keys of the general nodes and unicasting the public key of each of the general nodes to the master node;

the master node generating an encryption value obtained by exponentially calculating a secret key of the master node to the plurality of each of the public keys, and broadcasting a message including the encryption values to each of the general nodes; and (each of the general nodes obtaining the encryption value of each of the general nodes from the message, and obtaining a group key by using an inverse power calculation of the respective secret keys of each of the general nodes based on the encryption value of each of the general nodes;

leaving the group, wherein the leaving is performed by at least one general node from among the plurality of nodes;

broadcasting to the group an encryption value obtained by exponentially calculating a new secret key of the master node to the remaining public key excluding the public key of the at least one general node that left the group, wherein the broadcasting is performed by the master node; and obtaining a new group key by using an inverse power-calculation of respective secret keys of each of the remaining general nodes in the group based on the encryption value, wherein the obtaining is performed by the all remaining general nodes in the group.

2. The method of claim 1, further comprising:

joining the group, wherein the joining is performed by at least one new general node, aside from the plurality of nodes;

unicasting a public key that is based on a secret key of the at least one new general node to the master node, wherein the unicasting is performed by the at least one new general node;

broadcasting to the group an encryption value obtained by exponentially-calculating a new secret key of the master node to a public key that is pre-included in the master node and the unicasted public key by the at least one new general node, wherein the broadcasting is performed by the master node; and obtaining a new group key by using an inverse power-calculation of respective secret keys of each of all general nodes in the group based on the encryption value, wherein the obtaining is performed by the all general nodes in the group.

3. A method of generating a dynamic group key of a group formed of a plurality of general nodes and a master node, said method comprising:

each of the general nodes generating a public key that is based on respective secret keys of the general nodes and unicasting the public key of each of the general nodes to the master node;

the master node generating an encryption value obtained by exponentially calculating a secret key of the master node to the plurality of each of the public keys, and broadcasting a message including the encryption values to each of the general nodes; and each of the general nodes obtaining the encryption value of each of the general nodes from the message, and obtaining a group key by using an inverse power calculation of the respective secret keys of each of the general nodes based on the encryption value of each of the general nodes;

merging a first group and a second group, which share a group key generated using the method respectively, wherein the merging comprises:

unicasting a list of public keys of general nodes in the first group, wherein the list is included in a first master node of the first group, to a second master node of the second group;

unicasting a public key that is based on a new secret key of the first master node to the second master node; and broadcasting to the merged first and second groups an encryption value obtained by exponentially-calculating a new secret key of the second master node, wherein the broadcasting is performed by the second master node upon receiving the plurality of public keys.

4. A method of generating a dynamic group key of a group formed of a plurality of general nodes and a master node, said method comprising:

each of the general nodes generating a public key that is based on respective secret keys of the general nodes and unicasting the public key of each of the general nodes to the master node;

the master node generating an encryption value obtained by exponentially calculating a secret key of the master node to the plurality of each of the public keys, and broadcasting a message including the encryption values to each of the general nodes; and each of the general nodes obtaining the encryption value of each of the general nodes from the message, and obtaining a group key by using an inverse power calculation of the respective secret keys of each of the general nodes based on the encryption value of each of the general nodes, further comprising dividing a group sharing a group key generated using the method into a first group and a second group, wherein the dividing comprises:

unicasting a list of public keys of general nodes included in the second group from among public keys of general nodes in the group before being divided, to a second master node of the second group, wherein the list is included in a first master node of the first group and the unicasting is performed by the first master node of the first group;

broadcasting to the first group a first encryption value obtained by exponentially calculating a new secret key of the first master node to the public key of the general node of the first group, wherein the broadcasting is performed by the first master node;

broadcasting to the second group a second encryption value obtained by exponentially-calculating a secret key of the second master node to the public key of the general node of the second group, wherein the broadcasting is performed by the second master node; and obtaining respective group keys by using an inverse power-calculation of the respective secret keys of the general nodes of the first and second groups based on the first and second encryption values, wherein the obtaining is performed by the general nodes of the first and second groups.

* * * * *